United States Patent
Hawley

(10) Patent No.: US 11,691,473 B1
(45) Date of Patent: Jul. 4, 2023

(54) SUSPENSION ASSEMBLY FOR VEHICLE

(71) Applicant: Metal-tech Cage, LLC, Newberg, OR (US)

(72) Inventor: Mark D. Hawley, Dundee, OR (US)

(73) Assignee: Metal-tech Cage, LLC, Newberg, OR (US)

( * ) Notice: Subject to any disclaimer, the term of this patent is extended or adjusted under 35 U.S.C. 154(b) by 0 days.

(21) Appl. No.: 17/675,938

(22) Filed: Feb. 18, 2022

Related U.S. Application Data

(60) Provisional application No. 63/152,718, filed on Feb. 23, 2021.

(51) Int. Cl.
*B60G 9/00* (2006.01)
*B60G 11/54* (2006.01)
*B60G 15/04* (2006.01)

(52) U.S. Cl.
CPC .............. *B60G 9/003* (2013.01); *B60G 11/54* (2013.01); *B60G 15/04* (2013.01)

(58) Field of Classification Search
CPC .... B60G 9/003; B60G 15/04; B60G 2202/31; B60G 2202/312; B60G 2204/124; B60G 2204/125; B60G 2204/128; B60G 2204/129; B60G 2204/12; B60G 17/02; B60G 11/54
See application file for complete search history.

(56) References Cited

U.S. PATENT DOCUMENTS

| 5,180,144 A * | 1/1993 | Hellyer | F16F 9/0454 267/64.19 |
| 5,954,318 A * | 9/1999 | Kluhsman | B60G 11/16 267/221 |
| 6,182,953 B1 * | 2/2001 | Smith | B60G 15/063 267/33 |
| 6,752,408 B2 * | 6/2004 | La | F16F 9/54 280/124.152 |

(Continued)

FOREIGN PATENT DOCUMENTS

| FR | 2811615 A1 * | 1/2002 | ............ B60G 11/52 |
| WO | WO-2004076209 A1 * | 9/2004 | ........... B60G 13/003 |

OTHER PUBLICATIONS

Metal-tech 4×4, Toyota Rear Upper Spring Isolators, https://www.metaltech4x4.com/toyota-rear-spring-upper-isolators-original-equipment-sold-in-pairs, sold prior to Feb. 23, 2021, 4 pages.

*Primary Examiner* — Karen Beck
*Assistant Examiner* — Daniel M. Keck
(74) *Attorney, Agent, or Firm* — Klarquist Sparkman, LLP

(57) ABSTRACT

This disclosure is directed to suspension assemblies for vehicles. More specifically, this disclosure is directed to secondary springs for suspension assemblies of vehicles. In some embodiments, a secondary spring can comprise a base, a tip, and one or more extension members positioned between the base and the tip that are configured to be removably coupled to the base and/or the tip to adjust a length of the secondary spring. In some embodiments a user (Continued)

can adjust the length of the secondary spring, so that the secondary spring is compatible with a given coil spring of the suspension assembly, by increasing or decreasing the number of extension members included in the secondary spring and/or by replacing one or more of the extension members with longer or shorter extension members.

20 Claims, 7 Drawing Sheets

(56) References Cited

U.S. PATENT DOCUMENTS

| | | | |
|---|---|---|---|
| 2004/0012136 A1* | 1/2004 | Mennesson | B60G 15/065 267/219 |
| 2013/0154226 A1* | 6/2013 | Johnson | B60G 9/003 29/896.91 |

* cited by examiner

SUSPENSION ASSEMBLY FOR VEHICLE

CROSS-REFERENCE TO RELATED APPLICATION

The present application claims the benefit of U.S. Provisional Application No. 63/152,718, filed Feb. 23, 2021, which is incorporated herein by reference.

FIELD

This disclosure relates generally to suspension assemblies for vehicles.

BACKGROUND

For cosmetic reasons and/or to improve off-road characteristics, vehicle owners can replace the stock/factory coil springs of their vehicle's suspension system with larger aftermarket springs that lift the vehicle's frame/body farther off the wheels and axles. However, doing so can prevent other components of the suspension system from working properly. For example, secondary springs of the rear portion of the vehicle's suspension system cannot function as well, if at all, after installing larger aftermarket coil springs. These secondary springs (often referred to as "sub-assembly springs," and/or "spring insulators") also can be fitted between the axle and the frame/body and are configured to further regulate wheel travel, such as to help prevent the tires from hitting the wheel-wells. That said, the secondary springs are typically shorter than the stock coil springs, and thus can only engage once the coil springs have been partially compressed. Because longer aftermarket coil springs create more space between the axle and the frame/body, the secondary springs cannot engage at all, or can engage only partially, before the tires contact the wheel-wells, especially if the owner also replaces the stock tires with larger aftermarket tires that reduce clearance between the tires and the wheel-wells.

Thus, longer secondary springs are desired that are compatible with larger aftermarket coil springs. However, because aftermarket coil springs can be available in a variety of sizes, a longer secondary spring (one that is longer than the vehicle's stock secondary springs) can only be compatible with a limited number of aftermarket coil springs, especially if the longer secondary spring has a fixed, non-adjustable length. Thus, secondary springs are desired that can be tailored to fit a wider range of aftermarket coil spring sizes.

SUMMARY

Aspects and advantages of the disclosed technology will be set forth in part in the following description, or can be obvious from the description, or can be learned through practice of the technology disclosed in the description.

Disclosed herein are modular secondary springs that can be tailored to fit the size of virtually any coil spring. The modular secondary springs include one or more extension members that can be added as needed to lengthen the modular secondary springs so that they are compatible with a given aftermarket coil spring. In this way, the length of the modular secondary springs can be adjusted so that the secondary springs still function normally when larger aftermarket coil springs are installed in a vehicle.

In some embodiments, a secondary spring for a suspension assembly of a vehicle comprises a base, a tip, and one or more extension members positioned between the base and the tip that are configured to be removably coupled to the base and/or the tip to adjust a length of the secondary spring.

In other embodiments, a suspension assembly for a portion of a suspension system of a vehicle comprises a coil spring and a secondary spring. The coil spring comprises a helical body defining a lumen, and the secondary spring is disposed within the lumen of the coil spring and comprises one or more extension members that are configured to be removably coupled to the secondary spring to adjust a length of the secondary spring.

In yet further embodiments, a method for assembling a secondary spring of a suspension assembly of a vehicle comprises removably coupling one or more extension members between a base and a tip of the secondary spring to adjust a length of the secondary spring.

These and other features, aspects, and/or advantages of the present disclosure will become better understood with reference to the following description and the claims. The accompanying drawings, which are incorporated in and constitute a part of this specification, illustrate embodiments of the disclosed technology and, together with the description, explain the principles of the disclosure.

DETAILED DESCRIPTION

General Considerations

Figure 1:
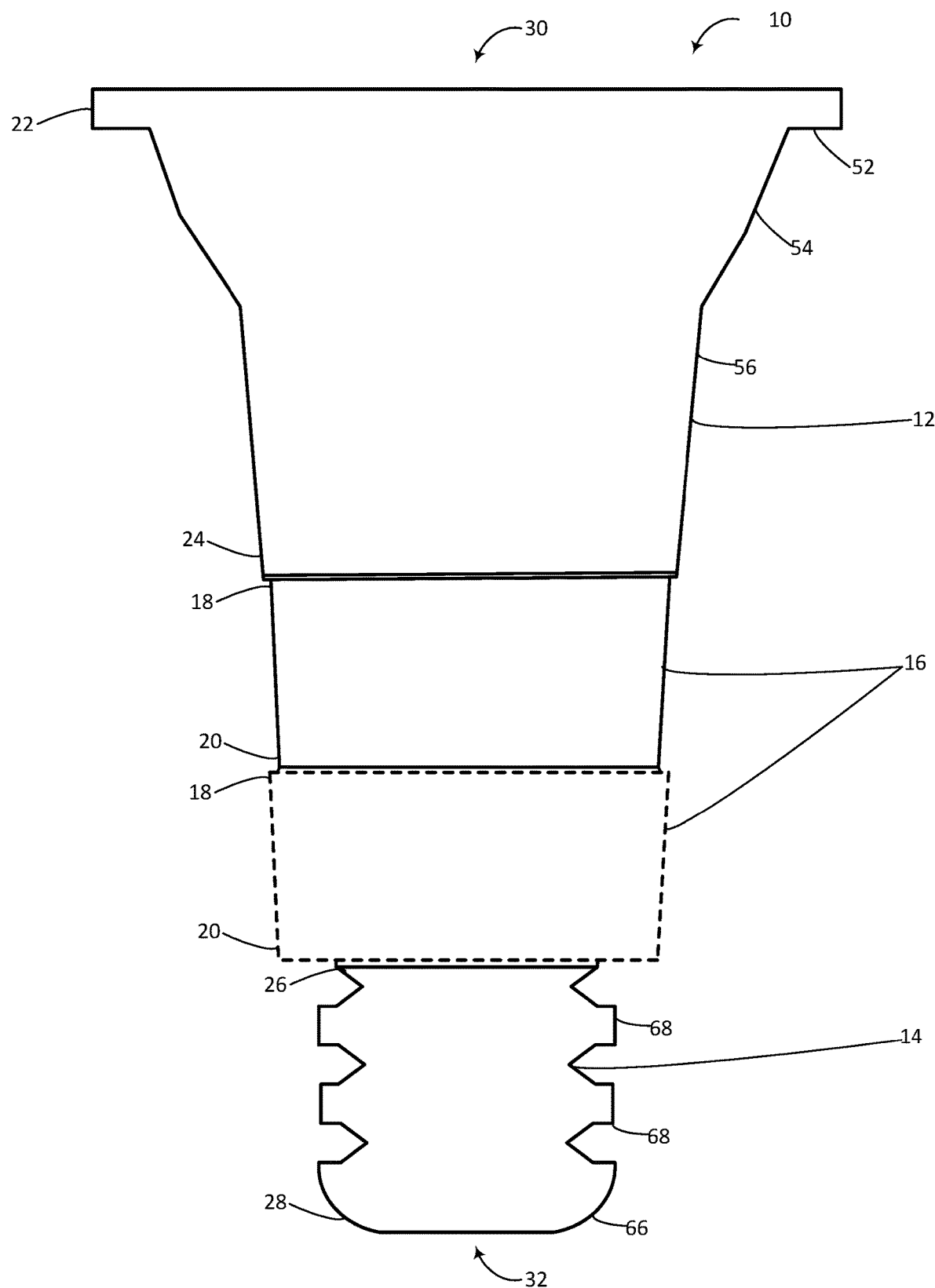
FIG. 1 is a schematic of a secondary spring, according to the present disclosure.

The apparatuses and devices described herein, and individual components thereof, should not be construed as being limited to the particular uses or systems described herein in any way. Instead, this disclosure is directed toward all novel and non-obvious features and aspects of the various disclosed embodiments, alone and in various combinations and subcombinations with one another. For example, any features or aspects of the disclosed embodiments can be used in various combinations and subcombinations with one another, as will be recognized by an ordinarily skilled artisan in the relevant field(s) in view of the information disclosed herein. In addition, the disclosed systems, methods, and components thereof are not limited to any specific aspect or feature or combinations thereof, nor do the disclosed things and methods require that any one or more specific advantages be present or problems be solved.

As used in this application, the singular forms "a," "an," and "the" include the plural forms unless the context clearly dictates otherwise. Additionally, the term "includes" means "comprises." Further, the terms "coupled" or "secured" encompass mechanical and chemical couplings, as well as other practical ways of coupling or linking items together, and do not exclude the presence of intermediate elements between the coupled items unless otherwise indicated, such as by referring to elements, or surfaces thereof, being "directly" coupled or secured. Furthermore, as used herein, the term "and/or" means any one item or combination of items in the phrase.

As used herein, the term "exemplary" means serving as a non-limiting example, instance, or illustration. As used herein, the terms "e.g.," and "for example," introduce a list of one or more non-limiting embodiments, examples, instances, and/or illustrations.

As used herein, the terms "attached" and "coupled" generally mean physically connected or linked, which includes items that are directly attached/coupled and items that are attached/coupled with intermediate elements between the attached/coupled items, unless specifically stated to the contrary.

As used herein, the terms "fixedly attached" and "fixedly coupled" refer to two components joined in a manner such that the components cannot be readily separated from one another without destroying and/or damaging one or both of the components. Exemplary modalities of fixed attachment can include joining with permanent adhesive, stitches, welding or other thermal bonding, and/or other joining techniques. In addition, two components can be "fixedly attached" or "fixedly coupled" by virtue of being integrally formed, for example, in a molding process.

In contrast, the terms "removably attached" or "removably coupled" refer to two components joined in a manner such that the components can be readily separated from one another to return to their separate, discrete forms without destroying and/or damaging either component. Exemplary modalities of temporary attachment can include mating-type connections, releasable fasteners, removable stitches, screw or threaded connections, snap-fit connections, and/or other temporary joining techniques.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the detailed description, abstract, and drawings.

The Disclosed Technology and Exemplary Embodiments

Disclosed herein are secondary springs for suspension assemblies for a vehicle's suspension system, such as the rear portion or the front portion of the vehicle's suspension system. The length of the secondary springs disclosed herein can be adjusted so that the secondary springs still function properly when a vehicle owner replaces the coil springs of their vehicle's suspension system with differently sized coil springs (e.g., larger aftermarket coil springs). Specifically, the secondary springs disclosed herein can include one or more extension members, any number of which can be added or removed to adjust the length of the secondary springs. Because of this modular design, the secondary springs disclosed herein can be compatible with a wider range of coil spring sizes than conventional secondary springs. Specifically, vehicle owners can add or remove the extension members to make the secondary springs compatible with virtually any coil spring size. As such, vehicle owners can re-use the secondary springs disclosed herein when replacing their vehicle's coil springs rather than having to buy entirely new secondary springs, thus reducing costs for the vehicle owner.

Further, the secondary springs' modular design allows a vehicle owner to adjust the length of the secondary springs to more precisely fit a given aftermarket coil spring, thereby improving the secondary springs' performance compared to conventional, fixed-length secondary springs. Specifically, a vehicle owner can fine tune the length of a secondary spring to maximize the secondary spring's performance for a given coil spring. As discussed above, improving the performance of the secondary spring can improve the overall performance of the vehicle's suspension system and/or can help prevent damage to one or more vehicle components, such as by restricting wheel travel to help prevent the tires from contacting the wheel-wells.

Additional information and examples are provided below with reference to the accompanying drawings.

Figure 2:
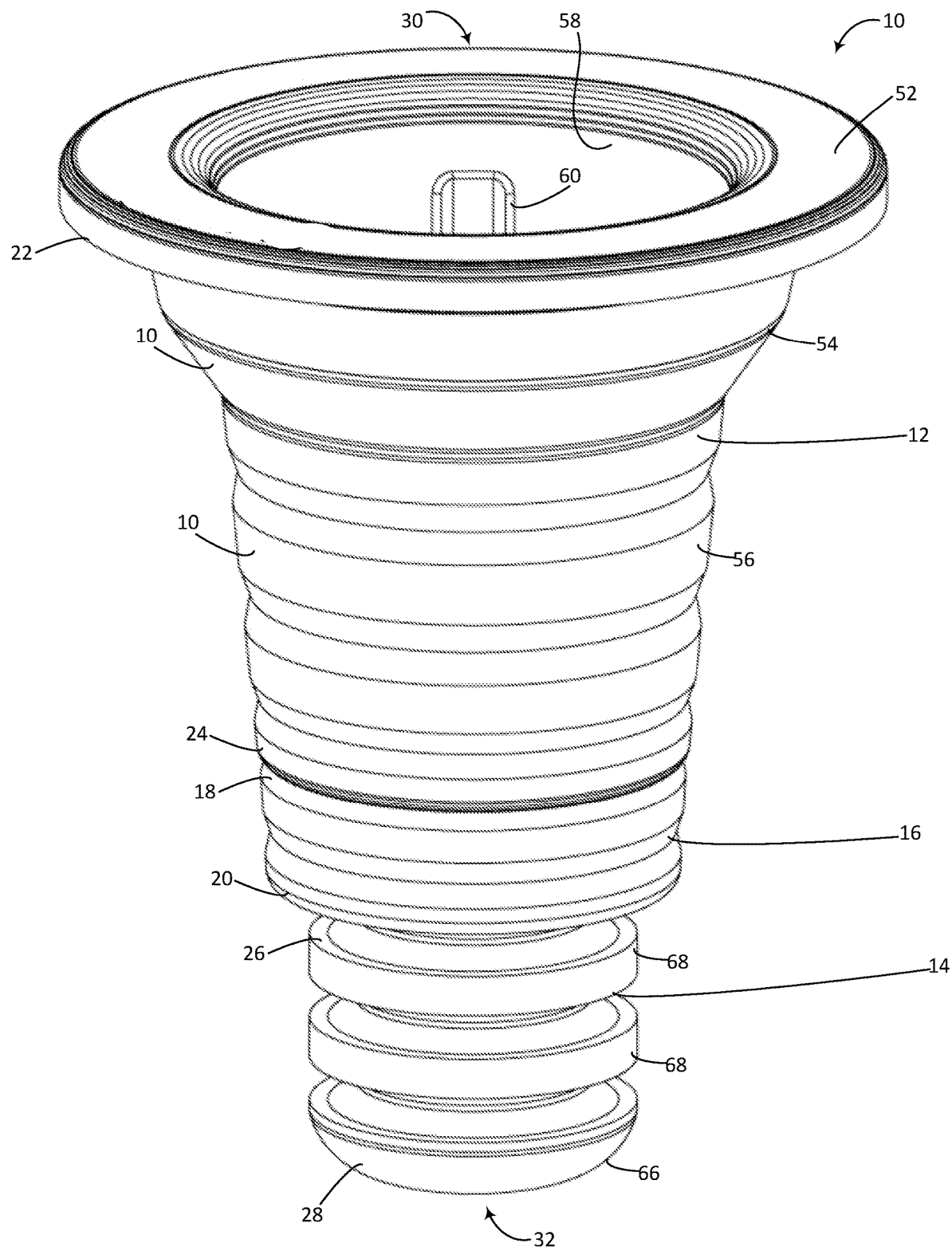
FIG. 2 is a side perspective view of an embodiment of the secondary spring of FIG. 1.
Figure 3:
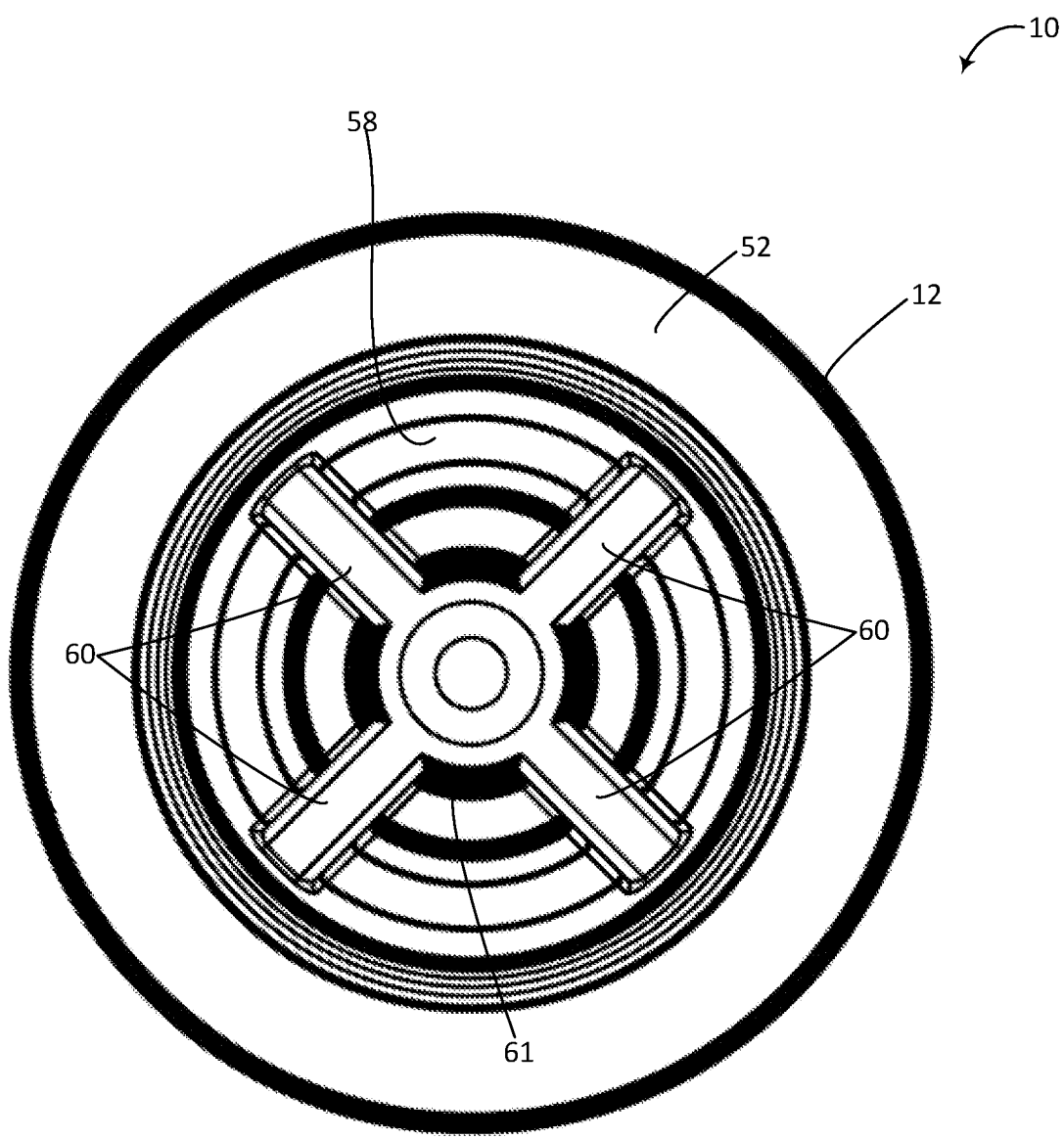
FIG. 3 is a top plan view of the secondary spring of FIG. 2.
Figure 4:
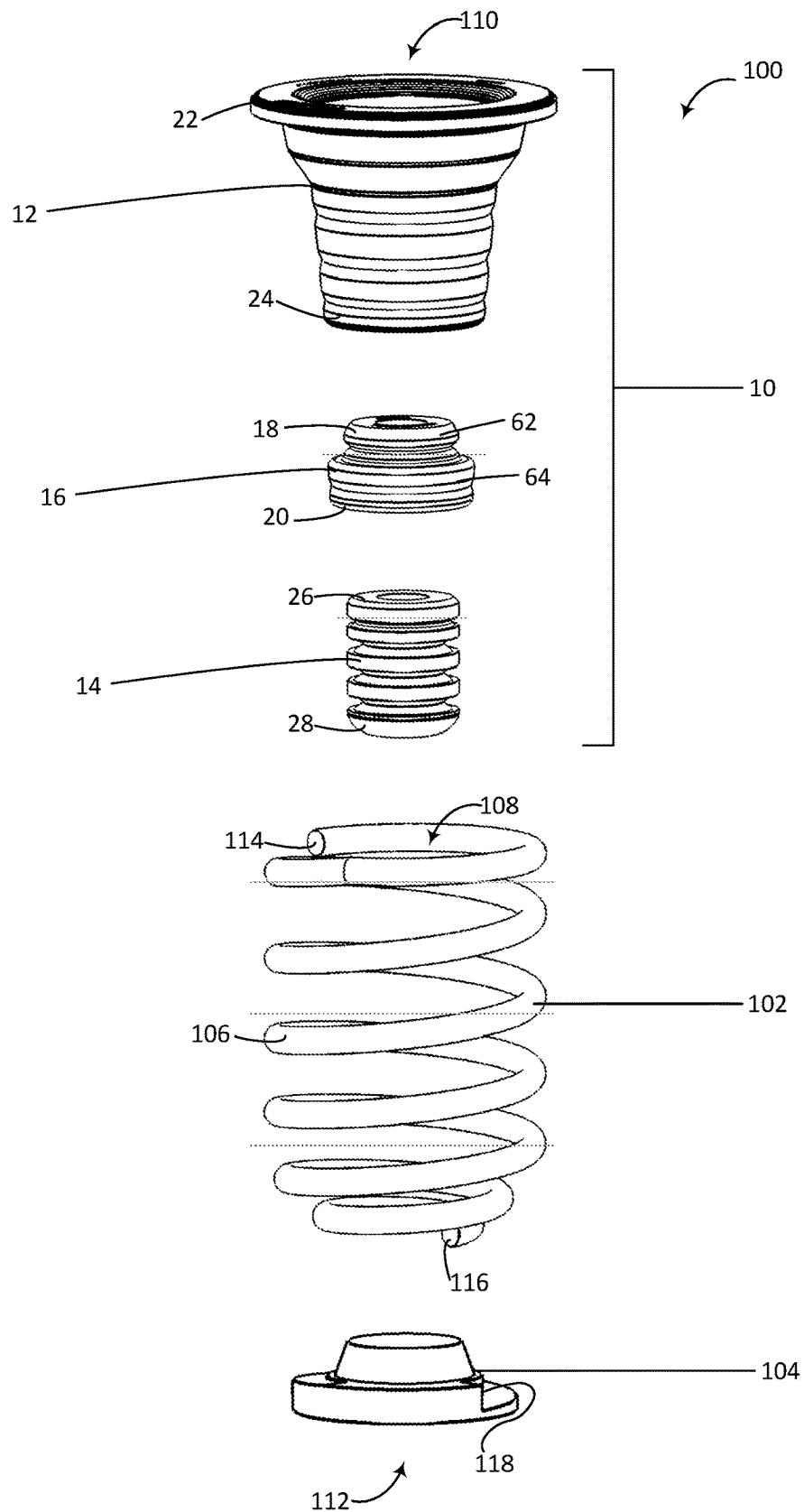
FIG. 4 is an exploded view of a rear suspension assembly, according to the present disclosure, that includes the secondary spring of FIGS. 1-3.
Figure 5:
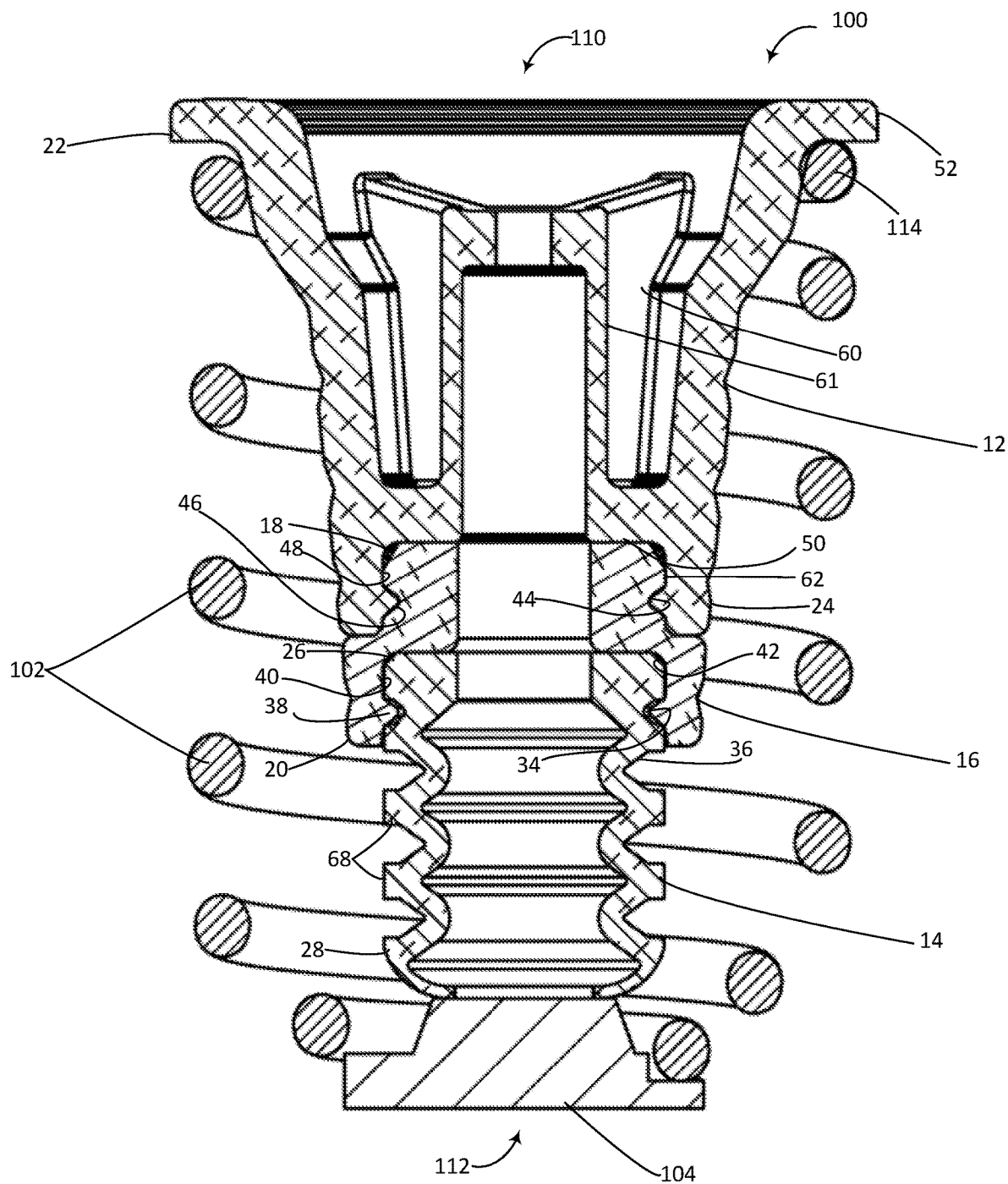
FIG. 5 is a cross-sectional view of the rear suspension assembly of FIG. 3, with the secondary spring in a relaxed state.
Figure 6:
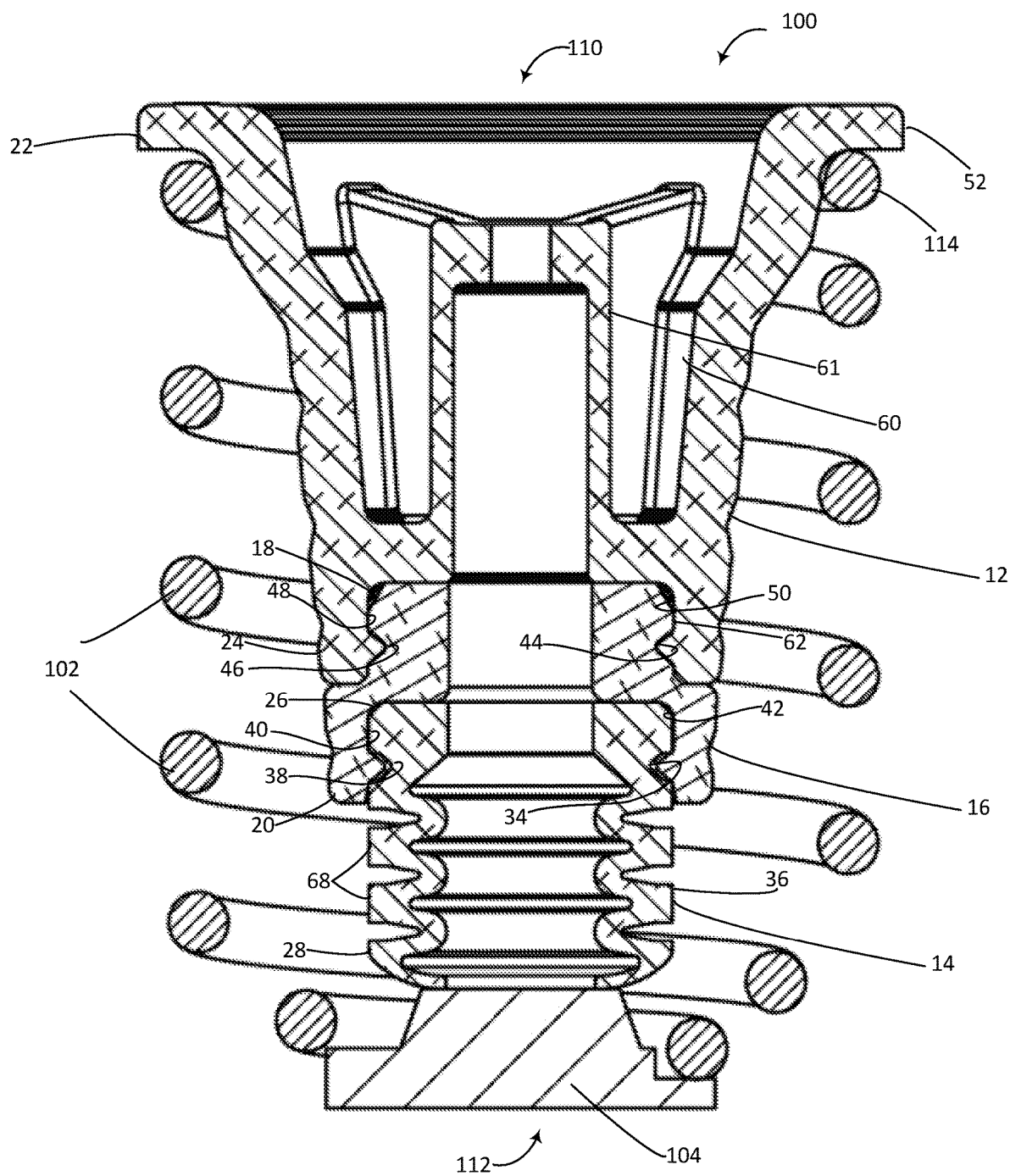
FIG. 6 is a cross-sectional view of the suspension assembly of FIGS. 3-4, with the secondary spring in a compressed state.
Figure 7:
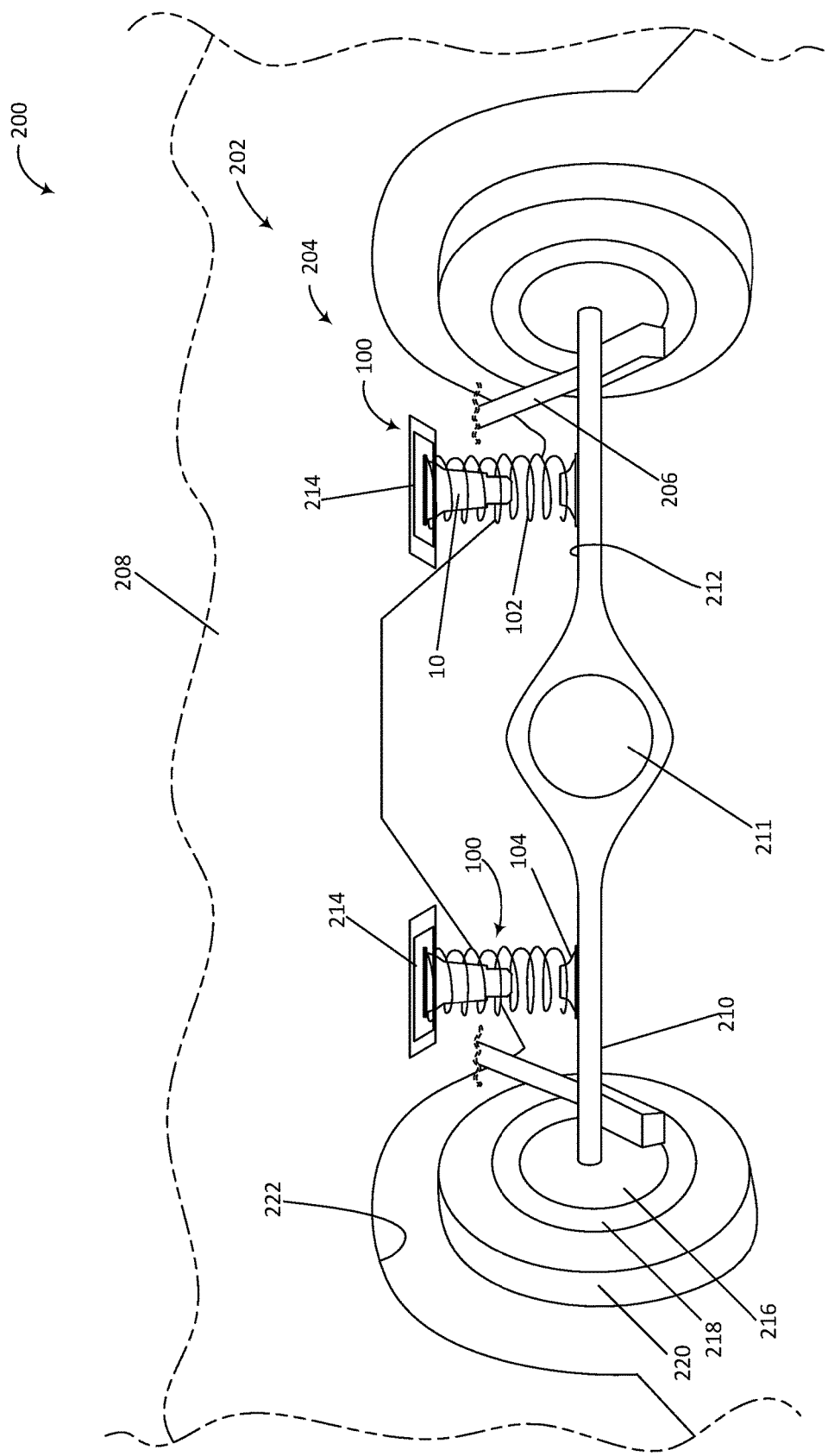
FIG. 7 is a schematic of an exemplary rear suspension assembly installed in a vehicle.

FIG. 1 depicts a schematic of an exemplary secondary spring, while FIGS. 2-3 show a specific embodiment of the exemplary secondary spring of FIG. 1. FIGS. 4-6 show an exemplary rear suspension assembly in which an exemplary secondary spring can be included. Specifically, FIG. 4 depicts an exploded view of the suspension assembly, while FIGS. 5 and 6 show cross-sectional views of the suspension assembly in which the secondary spring is in a relaxed, extended state and a loaded, compressed state, respectively. FIG. 7 depicts a schematic showing how the rear suspension assembly can be installed in a vehicle.

As shown in FIGS. 1-6, a secondary spring 10 (which also can be referred to as "secondary spring assembly 10," "sub-assembly spring 10" and/or "coil spring insulator 10") comprises a base 12, a tip 14, and one or more extension members 16 that are positioned between the base 12 and the tip 14. The one or more extension members 16 can be removably coupled to the base 12 and/or the tip 14 so that the number and/or size of the extension members 16 included in the secondary spring 10 can be modified to adjust the length of the secondary spring 10. For example, a user can add extension members 16 to lengthen the secondary spring 10 and/or remove extension members 16 from the secondary spring 10 to shorten the secondary spring 10. As another example, a user can replace an extension member 16 with a longer or shorter extension member 16 to lengthen or shorten, respectively, the secondary spring 10. Thus, in some such examples, the one or more extension members 16 can comprise different sizes (e.g., lengths). However, in other examples, the one or more extension members 16 all can comprise the same size (e.g., length).

As indicated by the solid lines in FIG. 1 the secondary spring 10 can include exactly one extension member 16, in some examples. However, as introduced above, additional extension members 16 can be added to the secondary spring 10 to lengthen the secondary spring 10. Thus, in some examples, the secondary spring 10 can include more than one extension member 16. For example, as indicated by the dashed lines in FIG. 1, the secondary spring 10 can include two extension members 16. However, it should be appreciated that in still further examples, the secondary spring 10 can include more than two extension members 16, such as three extension members 16, four extension members 16, five extension members 16, six extension members 16, seven extension members 16, and/or eight or more extension members 16. Moreover, a user can add as many extension members 16 as desired to fit a particular coil spring. In this way, the secondary spring 10 can be compatible with a wider range of coil spring sizes than conventional secondary springs and/or the length of the secondary spring 10 can be more finely tuned to maximize the performance of the secondary spring for a given coil spring.

To enable multiple extension members 16 to be included in the secondary spring 10, the extension members 16 can be configured to be removably coupled to one another in addition to being removably coupled to the base 12 and/or the tip 14. For example, as shown in FIGS. 4-6, each extension member 16 can include a first end portion 18 that is configured to removably couple the extension member 16 to the base 12 and/or to another extension member 16 and a second end portion 20 that is configured to removably couple the extension member 16 to the tip 14 and/or to another extension member 16. In this way, a user can add as many of the extension members 16 as desired between the tip 14 and the base 12.

The base 12 can include a first end portion 22 and a second end portion 24 opposite the first end portion 22. The first end portion 22 can be configured to be positioned more proximate a body/frame of a vehicle than the second end portion 24, while the second end portion 24 can be configured to be positioned more proximate an axle of the vehicle than the first end portion 22. Thus, the first end portion 22 can be positioned above (i.e., vertically higher) than the second end portion 24. Similarly, the tip 14 can include a first end portion 26 and a second end portion 28 opposite the first end portion 26. The first end portion 26 can be configured to be positioned above the second end portion 28, more proximate a body/frame of a vehicle than the second end portion 28. In this way, the base 12 can define and/or otherwise form a first end 30 (i.e., top) of the secondary spring 10 and the tip 14 can define and/or otherwise form a second end 32 (i.e., bottom) of the secondary spring 10.

The first end portion 18 of each extension member 16 can be removably coupled to the second end portion 20 of another extension member 16 and/or to the second end portion 24 of the base 12. The second end portion 20 of each extension member 16 can be removably coupled to the first end portion 18 of another extension member 16 and/or to the first end portion 26 of the tip 14. The various ends of the extension members 16, base 12, and/or tip 14 can be removably coupled to one another via a mechanical coupling arrangement. For example, in the embodiment illustrated in FIGS. 4-6, the first end portion of the tip 14 can be removably coupled to the second end portion 20 of one of the extension members 16 via a snap-fit arrangement, and the first end portion 18 of the extension members 16 can be removably coupled to the second end portion 20 of another extension member 16 and/or the second end portion 24 of the base 12 via a similar snap-fit arrangement. In some embodiments, the snap-fit arrangement can comprise a flange on one of the components of the secondary spring 10 (e.g., either on the base 12, the tip 14, or the extension members 16) that snaps into a mating groove on one of the other components of the secondary spring 10.

For example, as shown in FIGS. 5-6, the first end portion 26 of the tip 14 can include a circumferential groove 34 on an outer side 36 of the tip 14 that engages with a corresponding circumferential flange 38 (which also can be referred to herein as "inwardly extending flange 38") on an inner side 40 of the second end portion 20 of one of the extension members 16. Thus, the extension members 16 can include a cavity or opening 42 in the second end portion 20 that is configured to receive the first end portion 26 of the tip 14 and/or the first end portion 18 of another extension member 16 and the inwardly extending flange 38 that is included in this opening 42 of the extension members 16 can be configured to snap into the mating groove of another extension member 16 and/or the groove 34 of the tip 14. Thus, to removably couple the tip 14 to one of the extension members 16, a user can place the first end portion 26 of the tip 14 into the opening 42 of the extension member 16 and then push the end of the tip 14 past the circumferential flange 38 until the circumferential flange 38 of the extension member 16 snaps into the circumferential groove 34 of the tip 14.

Similarly, the first end portion 18 of each extension member 16 can include a circumferential groove 44 that is configured to engage with the circumferential flange 38 of another extension member 16 and/or a circumferential flange 46 (which also can be referred to herein as "inwardly extending flange 46") of the base 12 that is included on an inner side 48 of the base 12. Thus, the second end portion 24 of the base 12 also can include a cavity or opening 50 that is configured receive the first end portion 18 of an extension member 16 and that includes a circumferential flange that is configured to snap into the circumferential groove 44 of the extension members 16 to removably couple to the base 12 to one of the extension members 16. To couple the extension member 16 to the base 12, a user can push the first end portion 18 of the extension member 16 into the opening 50 of the base 12 until the circumferential flange 46 of the base 12 snaps into the circumferential groove of the 44 of the extension member 16. Similarly, to removably couple the extension member 16 to another extension member 16, a user can push the first end portion 18 of the first extension member 16 into the opening 42 of the second extension member 16 until the circumferential flange 38 of the second extension member 16 snaps into the circumferential groove 44 of the first extension member 16.

In some embodiments the tip 14 can be sized and/or otherwise configured to be capable of being directly coupled to the base 12 without an intervening extension member 16. In some such embodiments, circumferential flange 46 of the base 12 can be configured to snap into the circumferential groove 34 of the tip 14 to removably couple the first end portion 26 of the tip 14 to the second end portion 24 of the base 12.

Although the circumferential groove is described as being included on the first end portions 18, 26 of the extension members 16 and the tip 14, respectively, and the circumferential flange is described as being included on the second end portions 20, 24 of the extension members 16 and the base 12, respectively, it should be appreciated that the orientation of the grooves and flanges can be reversed. That is, the first end portions of the extension members 16 and the tip 14 can include the circumferential groove, while the second end portion of the extension members 16 and the base 12 can include the circumferential flange.

Further, it should be appreciated that other types of mechanical coupling means can be used to removably couple the base 12, tip 14, and/or extension members 16, instead of and/or in addition to the above described snap-fit arrangement. For example, one or more of friction fit arrangements, interference fit arrangements, threaded engagements, fasteners, latches, hook and loop arrangements, clips, etc., can be used to removably couple the base 12, tip, 14, and/or extension members 16. In other embodiments, magnets can additionally or alternatively be employed to removably couple the base 12, tip 14, and/or extension members 16. In still further embodiments, the base 12, tip 14, and/or extension members 16 can be permanently coupled to one another, such as via welding and/or adhesives. In still further embodiments, one or more of the base 12, the tip 14, and/or the extension members 16 can be integrally formed together (e.g., molded) as a single, unitary piece instead of being separately formed as three separate, distinct pieces as described above.

The components of secondary spring 10 can be constructed from any of various elastomers, such as polyurethane, polybutadiene, styrene-butadiene, polychloroprene, silicone, polyacrylate, polyethylene, styrene-isoprene-styrene, styrene-butadiene-styrene, polypropylene, or natural rubber, and/or from various other types of polymers. The secondary spring 10 can be configured to be pliable enough to allow the components of the secondary spring 10 (base 12, tip, 14, and extension members 16) to snap into place with one another, but stiff enough to keep these components coupled together in the snap-fit arrangement described above. Thus, the secondary spring 10 can be stiff enough to prevent the base 12, the tip 14, and the extension members 16 from becoming decoupled from one another when a load is applied to the secondary spring.

As shown in FIGS. 1-2 and 4-6, the base 12 also can include a lip 52 at the first end portion 22 that extends radially outward from the rest of the base 12. The lip 52 can be configured to help seat the base 12 on top of a coil spring (FIGS. 4-6) and/or to help center the base 12 on a mounting structure within the frame/body of the vehicle. The base 12 can be generally cone-shaped and can taper from the first end portion 22 toward the second end portion 24, such that the base 12 is narrower more proximate the second end portion 24. In some embodiments, the base 12 can include a first tapered portion 54 (FIGS. 1-2) and a second tapered portion 56 (FIGS. 1-2). The first tapered portion 54 can extend between the lip 52 and the second tapered portion 56. In some such embodiments, the first tapered portion 54 can have a greater taper than the second tapered portion 56, as shown in FIGS. 1-2 and 4-6. However, although the base 12 is shown as being generally cone-shaped, it should be appreciated that the base 12 can have other shapes in other embodiments, such as cylindrical, annular, pyramidal, rectangular, etc.

In some embodiments, the base 12 also can include a cavity or recess 58 at the first end portion 22, as shown in FIGS. 2-6. In some such examples, the base 12 can include one or more support ribs 60 that extend between the sides of the cavity 58 and a centrally disposed, inner cylindrical portion 61 to provide additional structural support for the base 12. In some embodiments, the base 12 can include four support ribs 60 that are evenly circumferentially spaced from one another within the cavity 58 (i.e., spaced approximately 90 degrees from one another). In other embodiments, the opening 50 at the second end portion 24 of the base 12 can extend all of the way through the base 12 to the first end portion 22 of the base 12 and the ribs 60 can be positioned in the top portion of the opening 50.

The first end portion 18 of the extension members 16 can comprise a collar 62 (FIGS. 4-6) that is thinner/narrower (e.g., has a smaller diameter) than the rest the extension members 16. The collar 62 can be configured to fit within the opening 42 at the second end portion 20 of another extension member 16 or the opening 50 at the second end portion 24 of the base 12, while a body 64 (FIGS. 4-6) of the extension members 16 can be configured to approximately flush with and/or the same diameter as the second end portion 24 of the base 12. In other examples, the body 64 of the extension members 16 can be configured to have a larger or smaller diameter than the second end portion 24 of the base 12. In some examples, the body 64 of the extension members 16 can be substantially cylindrical. However, in other examples, the body 64 can taper from the first end portion 18 towards the second end portion 20.

The tip 14 of the spring 10 can be substantially cylindrical (i.e., can have a substantially constant diameter), but can include a rounded end 66 (FIGS. 1-2) that is configured to engage with a base mount of the spring assembly. However, in other examples, the tip 14 can have a non-cylindrical shape. For example, the tip 14 can have a taper similar the base 12. The first end portion 26 of the tip 14 can be sized and/or otherwise configured to fit within the opening 42 of the extension members 16.

The secondary spring 10 can be configured to be axially compressible and expandable between an axially compressed state (FIG. 6) and an axially elongated state (FIG. 5). The secondary spring 10 can be naturally biased to the axially elongated state. That is, the axially elongated state can be the resting state of the secondary spring 10 where the spring 10 is relaxed (i.e., the spring 10 is not under any load). Thus, the axially elongated state also can be referred to herein as the relaxed state.

In some embodiments, such as is shown in FIGS. 5-6, the majority of the axial compression and expansion of the spring 10 under applied loads is borne by the tip 14. Thus, the tip 14 can be configured to axially compress under a load to an axially compressed state (FIG. 6) but can be naturally biased to an extended state (FIG. 5). In some such embodiments, the tip 14 can include a plurality of bellows 68 (which also can be referred to herein as "folds 68") that are configured to fold and unfold to axially compress and axially expand, respectively, the tip 14. However, in other such examples, the tip 14 can include other types of structures that are configured to pivot and/or fold to axially compress and expand the tip 14. In yet further such examples, the tip 14 can comprise a compressible and/or deformable material, such as a shape-memory material, that is configured to return to the axially elongated state after being compressed by a load.

The base 12 and/or the extension members 16 can also experience some degree of axial compression and expansion due to the natural resiliency of the material used to form these components. In some embodiments, the base 12 and/or the extension members 16 can additionally or alternatively be formed with features, such as bellows 68, to increase the ability of these components to axial compress and expand under applied loads.

As shown in FIGS. 4-6, the secondary spring 10 can be configured to be included in a suspension assembly 100 (e.g., a rear suspension assembly) that is mounted between a frame/body of a vehicle and a rear axle of the vehicle, as will be described in greater detail below with reference to FIG. 7. The rear suspension assembly 100 includes a coil spring 102 and an axle mount 104 in addition to the secondary spring 10.

The coil spring 102 can comprise a helical body 106 that defines a lumen 108. The secondary spring 10 can be positioned at least partially within the lumen 108 of the coil spring 102. For example, as shown in FIGS. 5-6, the entirety of secondary spring 10, except for the lip 52, can be positioned within the lumen 108 of the coil spring 102. The lip 52 of the secondary spring 10 can extend over and/or rest on top of the body 106 of the coil spring 102 to help seat the secondary spring 10 on the coil spring 102. The secondary spring 10 (e.g., the lip 52 and/or base 12 of the secondary spring 10) can be configured to interface with a mounting structure on the frame/body of the vehicle to help secure a first end 110 of the suspension assembly to the frame/body of the vehicle. In other embodiments, the coil spring 102 can be configured to additionally or alternatively interface with the mounting structure on the frame/body of the vehicle. The mount 104 can be coupled to the rear axle of the vehicle to help secure a second end 112 of the suspension assembly to the rear axle. The coil spring 102 thus can be held and axially compressed between the lip 52 of the secondary spring 10 and the mount 104. Specifically a first end 114 (FIG. 4) of the coil spring 102 can be held under the lip 52 of the secondary spring 10 and a second end 116 (FIG. 4) of the coil spring 102 can be retained by a stop 118 (FIG. 4) that is included in the mount 104. During installation of the suspension assembly 100, the coil spring 102 can be rotated until the second end 116 of the coil spring 102 contacts/abuts the stop 118 of the mount 104.

As introduced above, the secondary spring 10 can be shorter than the coil spring 102 and can hang above the mount 104, without contacting the mount 104, at lower compressive loads (i.e., compressive loads less than a threshold). Thus, the secondary spring 10 cannot begin to engage (i.e., axially compress) until the coil spring 102 is at least partially compressed and the secondary spring 10 begins to contact the mount 104. FIG. 5 depicts the coil spring 102 in a partially compressed state, where the coil spring 102 is compressed enough that the mount 104 is contacting the secondary spring 10, but not enough that the mount 104 is compressing the secondary spring 10. Stated slightly differently, a compressive load has been applied to the coil spring 102 in FIG. 5 that is sufficient to partially compress the coil spring 102 but that is not sufficient to begin compressing the secondary spring 10. However, because the mount 104 is contacting the secondary spring 10 in the state depicted in FIG. 5, if an additional compressive load is applied to the suspension assembly 100 at the state shown in FIG. 5, the coil spring 102 will further axially compress and the secondary spring 10 will become engaged and begin to axially compress as well. When the secondary spring 10 is engaged, the suspension assembly 100 will restrict compression more than when only the coil spring 102 is engaged, thus further limiting wheel travel. FIG. 6 shows the secondary spring 10 in the compressed state.

As shown in FIG. 7, the suspension assembly 100 can be mounted in the rear of a vehicle 200 to form a portion of a suspension system 202 of the vehicle 200. More specifically, the suspension assembly 100 can be included at the rear of the vehicle 200 to form a rear portion 204 of the suspension system 202, together with shock absorbers 206 (which also can be referred to herein as "struts 206"). Thus, the rear portion 204 of the suspension system 202 can include the suspension assembly 100 and the shock absorbers 206.

The suspension system 202 can be mounted between a frame or body 208 of the vehicle 200 and a rear axle 210 of the vehicle. Specifically, the first end 110 of the suspension assembly can be coupled to the frame 208, while the second end 112 of the suspension assembly 100 can be coupled to the rear axle 210 between a rear differential 211 and the rear wheels of the vehicle. In some embodiments, the mount 104 of the suspension assembly 100 can be fixedly attached to a top 212 of the rear axle 210 via any suitable coupling means to couple the second end 112 of the suspension assembly 100 to the rear axle 210. For example, the mount 104 can be bolted to the axle 210 with fasteners. In another example, the mount 104 can be welded to the axle 210. In some embodiments, the first end 30 of the secondary spring 10 can be coupled to a mounting structure 214 included on the frame of the vehicle 200 via any suitable coupling means such as an interference, friction, and/or snap fit. For example, the mounting structure 214 can comprise a recess into which the lip 52 of the base 12 of the secondary spring 10 snaps. In another example, the mounting structure 214 can comprise a collar that is configured to extend into the cavity 58 at the first end portion 22 of the base 12. The lip 52 of the base 12 can fit over the collar and center the base 12 relative to the mounting structure 214 to prevent relative movement therebetween. 214

Vehicle 200 also can include rear brakes 216, rear wheels 218, and rear tires 220 attached to either end of the rear axle 210. The frame 208 of the vehicle 200 also can include wheel-wells 222 that are configured to provide clearance between the tires 220 and the frame 208. As discussed above, because the length of the secondary springs 10 can be adjusted to fit the length of virtually any coil spring size, the secondary springs 10 can help prevent the tires 220 from contacting the wheel-wells 222, no matter the size of the coil spring. In this way, a vehicle owner can retain the secondary springs 10 when replacing the coil springs with differently sized coil springs without sacrificing the durability and/or performance of the suspension system 202.

In some embodiments, a user can determine a size and/or number of extensions members 16 to include between the base 12 and the tip 14 based on a length of the coil spring 102 and/or based on a desired distance between the secondary spring 10 and the mount 104 when the coil spring 102 is in an uncompressed, relaxed state. For example, the vehicle manufacturer can specify a desired clearance or gap that should exist between the rounded end 66 of the tip 14 of the secondary spring 10 and the mount 104 of the suspension assembly 100 when the coil spring 102 is in its uncompressed, relaxed state. Based on length of the coil spring in its uncompressed state, the user can select the size and/or number of extension members to include in the secondary spring 10 to achieve this desired clearance between the secondary spring 10 and the mount 104.

Although FIG. 7 depicts the suspension assembly 100 installed on a rear axle of the vehicle, it should be understood that it also can be installed on a front axle of a vehicle or on other axels of a vehicle if the vehicle includes additional axles between the front and rear axles.

Any feature(s) of any example(s) disclosed herein can be combined with or isolated from any feature(s) of any example(s) disclosed herein, unless otherwise stated.

Additional Examples of the Disclosed Technology

In view of the above described implementations of the disclosed subject matter, this application discloses the additional examples enumerated below. It should be noted that one feature of an example in isolation or more than one feature of the example taken in combination and, optionally, in combination with one or more features of one or more further examples are further examples also falling within the disclosure of this application.

Example 1. A secondary spring for a suspension assembly of a vehicle, the secondary spring comprising a base; a tip; and one or more extension members positioned between the base and the tip that are configured to be removably coupled to the base and/or the tip to adjust a length of the secondary spring.

Example 2. The secondary spring of any example herein, particularly example 1, wherein the one or more extension members are removably coupled to the base and/or the tip via a snap-fit arrangement.

Example 3. The secondary spring of any example herein, particularly example 1 or 2, wherein the one or more extension members comprise two extension members.

Example 4. The secondary spring of any example herein, particularly example 3, wherein one of the two extension members is removably coupled to the tip and wherein the other of the two extension members is removably coupled to the base.

Example 5. The secondary spring of any example herein, particularly example 3 or 4, wherein the two extension members are removably coupled to one another.

Example 6. The secondary spring of any example herein, particularly example 1 or 2, wherein the one or more extension members comprise one extension member, wherein the one extension member is removably coupled to the base at a first end portion and is removably coupled to the tip at an opposite second end portion.

Example 7. The secondary spring of any example herein, particularly any one of examples 1-6, wherein the one or more extension members comprise a body and a collar, wherein the body comprises a cavity having an inwardly extending flange, and wherein the collar comprises a circumferential groove that is configured to receive the inwardly extending flange of another one of the one or more extension members to removably couple the two extension members together and/or that is configured to receive a circumferential flange of the base to removably couple the one or more extension members to the base.

Example 8. The secondary spring of any example herein, particularly example 7, wherein the collar of the one or more extension members is thinner than the body of the one or more extension members.

Example 9. The secondary spring of any example herein, particularly any one of examples 1-8, wherein the tip comprises a circumferential groove that is configured to receive a/the circumferential flange of the one or more extension members to removable couple the tip to the one or more extension members.

Example 10. The secondary spring of any example herein, particularly any one of examples 1-9, wherein the tip is axially compressible and expandable between an axially compressed state and an axially expanded state.

Example 11. The secondary spring of any example herein, particularly any one of examples 1-10, wherein the base comprises a lip that is configured to rest on top of a coil spring.

Example 12. The secondary spring of any example herein, particularly any one of examples 1-11, wherein the tip comprises a rounded end that is configured to contact a mount of a suspension assembly that is attached to a top of an axle of a vehicle.

Example 13. The secondary spring of any example herein, particularly any one of examples 1-12, wherein the secondary spring is configured to be included within a coil spring as part of a suspension assembly of a vehicle suspension system.

Example 14. A suspension assembly for a portion of a suspension system of a vehicle, the suspension assembly comprising: a coil spring having a helical body defining a lumen; and a secondary spring disposed within the lumen of the coil spring, the secondary spring comprising: one or more extension members that are configured to be removably coupled to the secondary spring to adjust a length of the secondary spring.

Example 15. The suspension assembly of any example herein, particularly example 14, wherein the secondary spring comprises the secondary spring of any example herein, particularly any one of examples 1-13.

Example 16. The suspension assembly of any example herein, particularly example 14 or 15, wherein the base of the secondary spring is configured to be coupled to a mounting structure in a frame of a vehicle.

Example 17. The suspension assembly of any example herein, particularly any one of examples 14-16, further comprising a mount that is configured to be coupled to a top of a rear axle of a/the vehicle.

Example 18. The suspension assembly of any example herein, particularly example 17, wherein a first end of the coil spring is configured to be retained under a/the lip of the base of the secondary spring, and wherein an opposite second end of the coil spring is configured to be retained by the mount such that the coil spring is held between the mount and the lip of the secondary spring.

Example 19. The suspension assembly of any example herein, particularly example 17 or 18, wherein the secondary spring is shorter than the coil spring and does not contact the mount when the suspension assembly is subjected to less than a threshold compressive load.

Example 20. A method for assembling a secondary spring of a suspension assembly of a vehicle, the method comprising: removably coupling one or more extension members between a base and a tip of the secondary spring to adjust a length of the secondary spring.

Example 21. The method of any example herein, particularly example 20, further comprising removably coupling two or more of the extension members together, removably coupling a first one of the two or more extension members to the base, and removably coupling a second one of the two or more extension members to the tip.

Example 22. The method of any example herein, particularly example 21, wherein the removably coupling two or more of the extension members together comprises inserting a collar of one of the two or more extensions members into a snap-fit arrangement with a cavity of one of the other two or more extension members.

Example 23. The method of any example herein, particularly any one of examples 20-22, further comprising determining a size and/or number of the one or more extension members to removably couple between the base and the tip based on a length and/or size of a coil spring of the suspension assembly.

Example 24. The method of any example herein, particularly any one of examples 20-23, wherein the removably coupling the one or more extension members between the base and the tip comprises inserting a/the collar of one of the one or more extension members into a snap-fit arrangement with a cavity in the base.

Example 25. The method of any example herein, particularly any one of examples 20-24, wherein the removably coupling the one or more extension members between the base and the tip comprises inserting the tip into a snap-fit arrangement with a/the cavity in one of the one or more extension members.

Example 26. The method of any example herein, particularly any one of examples 20-25, further comprising mounting the secondary spring on a/the coil spring of the suspension assembly such that a lip of the base of the secondary spring rests on a first end of the coil spring, coupling the base of the secondary spring to a mounting structure in a body of the vehicle, coupling a mount of the suspension assembly to a rear axle of the vehicle, and securing a second end of the coil spring to the mount.

In view of the many possible embodiments to which the principles of the disclosed invention can be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

The invention claimed is:

1. A secondary spring for a suspension assembly of a vehicle, the secondary spring comprising:
   a base;
   a tip; and
   one or more extension members positioned between the base and the tip that are configured to be removably coupled to the base and/or the tip to adjust a length of the secondary spring.

2. The secondary spring of claim 1, wherein the one or more extension members are removably coupled to the base and/or the tip via a snap-fit arrangement.

3. The secondary spring of claim 1, wherein the one or more extension members comprise two extension members.

4. The secondary spring of claim 3, wherein one of the two extension members is removably coupled to the tip and wherein the other of the two extension members is removably coupled to the base.

5. The secondary spring of claim 3, wherein the two extension members are removably coupled to one another.

6. The secondary spring of claim 1, wherein the one or more extension members comprise one extension member, wherein the one extension member is removably coupled to the base at a first end portion and is removably coupled to the tip at an opposite second end portion.

7. The secondary spring of claim 1, wherein the one or more extension members comprise a body and a collar, wherein the body comprises a cavity having an inwardly extending flange, and wherein the collar comprises a circumferential groove that is configured to receive the inwardly extending flange of another one of the one or more extension members to removably couple the two extension members together and/or that is configured to receive a circumferential flange of the base to removably couple the one or more extension members to the base.

8. The secondary spring of claim 7, wherein the collar of the one or more extension members is thinner than the body of the one or more extension members.

9. The secondary spring of claim 1, wherein the tip comprises a circumferential groove that is configured to receive a circumferential flange of the one or more extension members to removably couple the tip to the one or more extension members.

10. The secondary spring of claim 1, wherein the tip is axially compressible and expandable between an axially compressed state and an axially expanded state.

11. The secondary spring of claim 1, wherein the base comprises a lip that is configured to rest on top of a coil spring.

12. The secondary spring of claim 1, wherein the tip comprises a rounded end that is configured to contact a mount of a suspension assembly that is attached to a top of an axle of a vehicle.

13. The secondary spring of claim 1, wherein the secondary spring is configured to be included within a coil spring as part of a suspension assembly of a vehicle suspension system.

14. A suspension assembly for a portion of a suspension system of a vehicle, the suspension assembly comprising:
   a coil spring having a helical body defining a lumen; and
   a secondary spring disposed within the lumen of the coil spring, the secondary spring comprising:
      one or more extension members that are configured to be removably coupled to the secondary spring to adjust a length of the secondary spring.

15. The suspension assembly of claim 14, wherein the secondary spring comprises a base, a tip, and one or more extension members positioned between the base and the tip that are configured to be removably coupled to the base and/or the tip to adjust a length of the secondary spring.

16. The suspension assembly of claim 15, wherein the base of the secondary spring is configured to be coupled to a mounting structure in a frame of a vehicle.

17. The suspension assembly of claim 16, further comprising a mount that is configured to be coupled to a top of an axle of the vehicle.

18. The suspension assembly of claim 17, wherein a first end of the coil spring is configured to be retained under a lip of the base of the secondary spring, and wherein an opposite second end of the coil spring is configured to be retained by the mount such that the coil spring is held between the mount and the lip of the secondary spring.

19. The suspension assembly of claim 18, wherein the secondary spring is shorter than the coil spring and does not contact the mount when the suspension assembly is subjected to less than a threshold compressive load.

20. A method for assembling a secondary spring of a suspension assembly of a vehicle, the method comprising:
   removably coupling one or more extension members between a base and a tip of the secondary spring to adjust a length of the secondary spring.

* * * * *